Patented Nov. 1, 1932

1,885,365

UNITED STATES PATENT OFFICE

FREDERICK H. MACNEIL, OF BOSTON, MASSACHUSETTS, ASSIGNOR TO CONDIT ELECTRICAL MANUFACTURING CORPORATION, OF SOUTH BOSTON, MASSACHUSETTS, A CORPORATION OF MASSACHUSETTS

INCLOSED ELECTRIC SWITCH

Application filed November 3, 1930. Serial No. 493,030.

This invention relates to high tension cell inclosed electric switch gear of the type in which a main switch, usually an oil immersed switch, is used to connect an incoming high tension line with an inclosed bus which supplies power to one or more outgoing distribution feeders. The main switch is mounted on a wheeled support on which it is adapted to be moved into and out of circuit controlling position in the cell in which position its terminals, which constitute the movable contact members of automatic disconnecting switches, are in engagement with cooperating fixed line and bus terminal contact members which are carried by the cell, whereby the withdrawal of the main switch from the cell automatically isolates the incoming line from the bus. Manually operable disconnecting switches are provided in the conductors of the outgoing distribution feeders. These manually operable switches are not adapted to be operated when there is potential on the bus and consequently are located in a separate compartment in the cell, which compartment is normally closed by a removable barrier or door. The present invention is particularly concerned with means to govern the movements of the truck type switch to and from its circuit controlling position in the cell and also to control the operation of the manually operable disconnecting switches and to prevent the improper operation of either relative to the other.

Access to the manually operable disconnecting switches is obtained by removing the door or barrier which is located in the rear of the cell compartment, and it constitutes an object of the present invention to provide means for maintaining the door to the disconnecting switch compartment locked closed except when the main switch is open and has been withdrawn from its circuit controlling position in the cell, thus to isolate the incoming power line from the bus.

It is a further object of the invention to provide means which prevents the return of the truck to its circuit controlling position, or to a position in which the movable contact members of the isolating switches are within flashover distance of the fixed line and bus terminals, until the disconnecting switch compartment door is closed.

It frequently happens that power is supplied to the bus by two or more power lines, and in this case it is necessary that the truck type switches controlling all of the lines supplying power to the bus be withdrawn from their circuit controlling positions before the manually operable disconnecting switches in any of the distribution feeders are accessible for operation. For example, when the high tension power line is energized from two or more points, as from adjacent sections in a sectionalized ring feeder system, it is necessary to disconnect the bus from both of the ring feeder sections which are connected with it before the distribution feeder becomes deenergized. It is therefore a further object of the present invention to provide a pair of cell inclosed truck type switches of the type above outlined having the doors for the manually operable disconnecting switch compartments so interlocked with the main truck type switches thereof that neither of the disconnecting switch compartment doors can be opened until both truck type switches have been withdrawn from circuit controlling position a sufficient distance to provide a safe opening of the automatic disconnects thereof.

It is a further object of the invention to provide a pair of cell inclosed switch units as above described having means to prevent the return of either truck to its circuit controlling position until the disconnecting switch compartment doors of both switch units have been closed.

A further object is generally to improve the construction and performance of inclosed switch gear.

Figure 1:
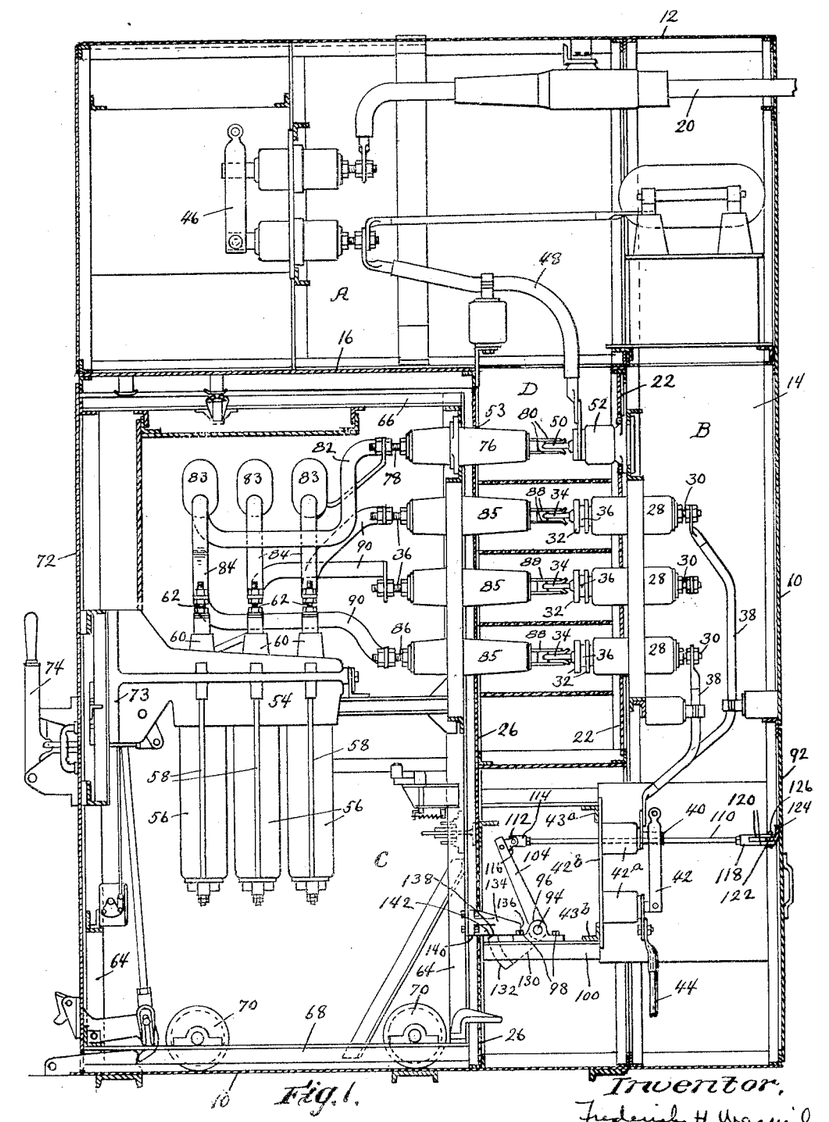
Fig. 1 is a side elevation of an inclosed electric switch gear embodying the invention, the inclosing cell structure being shown in section.
Figure 2:
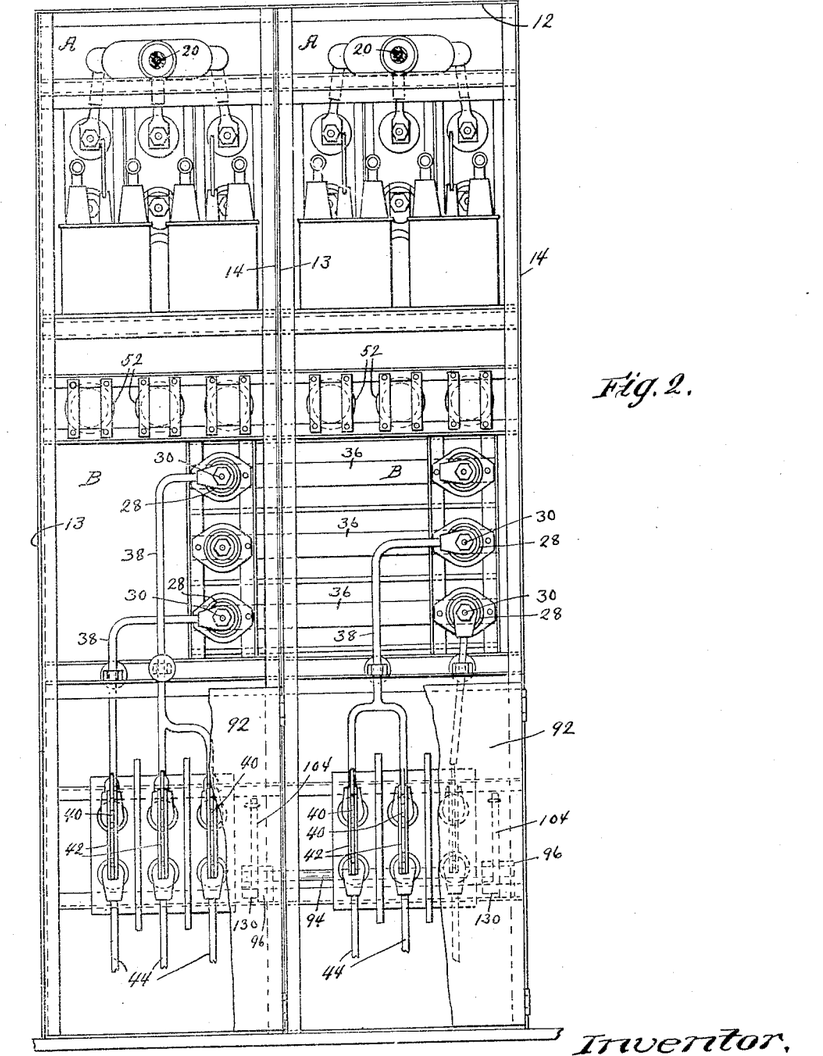
Fig. 2 is a rear view of two switch units arranged side by side, the rear wall of the cell structure being shown removed.

The switch gear here shown to illustrate the invention includes a unit cell structure having the rear wall 10, the top wall 12 and side walls 13 and 14, two units being shown side by side. The cell structure of each unit also includes a horizontal partition wall 16 spaced below the top wall 12 which provides a compartment A for an incoming high tension line 20, a vertical partition wall 22 which is disposed in front of the rear wall 10 and provides a compartment B for the outgoing distribution feeder, and a second vertical partition 26 which provides a rear wall for the main switch compartment C which is disposed in the foremost portion of the cell and which also provides the front wall for an intermediate bus compartment D. The partition wall 22 of each cell is provided with the three horizontal, vertically aligned insulating bushings 28 which extend therethrough and support the horizontal conducting studs 30. Said studs are provided at their forward ends with bus clamping members 32 which terminate in the forwardly extended fixed knife blade contact members 34, the cooperating movable contact members of which are carried by the main truck type switch, as will presently appear. The three phase bus bars 36 are supported in said bus clamping members 32 and, as shown most clearly in Fig. 2, extend through the intermediate adjacent side walls 13 and 14 of said cell compartments, portions of which are cut away in the vicinity of adjacent bus compartments D. Said studs 30 are connected at their opposite ends in compartment B by conductors 38 with the fixed contact jaws 40 of manually operable disconnecting switches 42, the movable switch members of which are electrically connected at their pivotal supports with the conductors 44 of the outgoing distribution feeder.

The incoming high tension supply line 20 for each switch gear is connected through manually operable disconnecting switches 46 and conductors 48 with the fixed knife blade contact members 50 of three horizontally aligned disconnecting switches which are supported in compartment D on insulating posts 52 carried by partition 22. Said fixed contact members 50 are adapted to cooperate with suitable aligned movable contact members carried by the main switch, whereby to connect the incoming lines with bus bars 36 through the separable main switch contacts. The main switch, or circuit interrupter, is of the three phase oil immersed type. Said switch comprises essentially a switch frame 54 which comprises a support and a cover for the open top of three separate phase oil receptacles 56 that are attached removably in position by means including tie rods 58.

The stationary switch members of the interrupter include the insulating bushings 60 and conducting studs 62 which are extended axially therethrough. Said studs extend downwardly into the oil in the receptacles 56 and also upwardly above said switch frame and terminate above said bushings 60. The switch is adapted to be supported above the floor and to be movable horizontally into and out of its inclosing cell on a wheeled frame work including the four vertical corner angles 64 and the horizontal top and bottom connecting angles 66 and 68, which frame work is mounted on wheels 70. Said frame work is further provided with a front panel 72 which when the switch is in its circuit controlling position provides a closure for the open front of the switch compartment C. Said switch frame has a vertical platen 73 by which it is secured to the rear face of said panel whereby to support the switch in elevated position above the truck platform. An operating handle 74 on the front face of said panel 72 is operatively connected with a movable switch member of the switch, not shown, whereby to open and close the switch.

Three horizontally aligned insulating bushings 76, one for each phase of the switch, are supported at the top of said switch supporting frame work and project rearwardly therebeyond in axial alignment with the horizontal insulating post 52 of the cell and are adapted when the switch is in its circuit controlling position in the cell, to extend through suitable aligned passages 53 in the wall 26 into the bus compartment D. Said bushings provide an insulating support for the horizontal conducting studs 78. Said studs are provided at their rearwardly extended ends with contact jaws 80 which constitute the movable contact members of the aforesaid automatic disconnecting switches and which are arranged to engage the knife blade contacts 50 when the switch is in circuit controlling position in its cell. The opposite ends of said studs 78 are separately connected through conductors 82, current transformers 83 and conductors 84 with a similar terminal of each phase of the circuit interrupter. Three similar vertically aligned insulating bushings 85 are carried by said truck frame and extend rearwardly therebeyond. Said bushings are provided with horizontal conducting studs 86 which terminate at their rearwardly extended ends in the contact jaws 88 that comprise the movable contact members of automatic disconnecting switches which cooperate in the circuit controlling position of the switch with the fixed knife blade contacts 34. Said studs 86 are connected at their other end through conductors 90 with the other and similar terminals of the circuit interrupter. It will thus be evident that when the truck type circuit interrupter is withdrawn from circuit controlling position in the cell that the incoming high tension power line 20 is completely isolated from the bus bars 36.

As herein shown the outgoing conductors 44 are adapted to supply the windings of three single phase power transformers, not shown, the particular arrangement shown being for the purpose of permitting open delta operation of the distribution transformers, if desired, as is common practice in the art. The disconnecting switches 42 located in the lower portion of the compartment B are mounted on insulating posts 42a which are secured to insulating panels 42b carried by upper and lower transverse angles 43a and 43b which are secured, as by welding, to the frame work of the cell.

Said disconnecting switches are accessible for operation only through the outwardly swinging hinged doors 92, one of which is provided for each of said cell compartments. Since power is supplied to the bus through two incoming power lines represented by conductors 20 it will be evident that in order safely to operate the disconnecting switches 40, which are not adapted to be operated when there is potential on the bus, it is necessary that both the incoming power lines be positively isolated from the common bus. In accordance with the present invention means are provided to interlock the doors 92, by which access is gained to said disconnecting switches, with the movements of the truck type circuit interrupters to and from their circuit controlling positions in the cell, so that neither of the disconnecting switch compartment doors 92 can be opened until both switch trucks have been withdrawn a suitable distance from their circuit controlling position, and so that neither switch truck can be returned to its position in the cell until both disconnecting switch compartment doors are in closed position.

To this end, means are provided to connect said doors 92 for conjoint operation. Said means includes a common interconnecting shaft 94, shown most clearly in Fig. 4, which is journalled at its opposite ends in bearing blocks 96 which are fixed by means of bolts 98 to the horizontal inwardly extended legs of angle members 100 which are secured by welding to the similar side walls 14 of said cells in the lower portion of compartment D. Said shaft 94 is adapted to extend through the right hand cell, as viewed in Fig. 2, and into compartment D of the adjacent cell. Fixed collars 102 on said shaft 94 bear against the confronting faces of said bearing blocks 96 whereby to prevent axial displacement of the shaft in its bearings. As shown most clearly in Figs. 3 and 4, said shaft is provided at each end with a generally vertical upstanding crank arm 104 which is secured to said shaft in fixed angular relation thereto by means of a tapered pin 106 which is driven through aligned tapered passages in said shaft and the hub 108 of said crank arm. Said crank arms 104 are located at the ends of said shaft 94 adjacent the side walls 14 of the respective cells and are connected separately at their free ends each with a rearwardly extended reach rod 110 by means of a universal joint 112, one yoke 114 of which is adjustably screw threaded to the end of said rod 110 and the other yoke 116 of which is fixedly secured in the upper end of said crank arm. Said rods 110 are provided at their other and free ends with adjustable yokes 118, the bifurcated arms 120 of which are adapted to receive the horizontal web 122 of an angle 124 which is secured by welding to the inner face of each disconnecting switch compartment door 92. A pin 126 which passes through the bifurcations 120 and the web 122 of said angle provides a pivotal connection between said rod and the compartment door. Said angle 124 is adapted to terminate somewhat short of the hinged edge of the door 92 as shown most clearly in Fig. 4 whereby to permit the end of the web 122 to enter between the bifurcations 120 of the yoke 118 in the open position of the door. The pivotal point of connection between said rod 110 and the angle 124 of said door is suitably chosen a sufficient radial distance from the vertical line including the hinges 128 of said door whereby to provide a suitable amount of axial movement of said rod 110 by the opening and closing movement of the door to operate locking means for said doors which will now be described.

Said locking means includes cooperating fixed and movable abutment members carried respectively by each cell and truck which interlock to prevent improper movement of both the truck and the disconnecting switch compartment doors. Said fixed abutment comprises a generally horizontal forwardly extended arm 130 which is carried by the connecting shaft 94 in fixed angular relation therewith and consequently with the crank arms 104 thereof. Preferably as here shown the abutment 130 is formed integral with the hub 108 of said crank arm 104, although it may be otherwise secured to the shaft. Said abutment is of generally sector shape and terminates in an arcuate end portion 132. Said cooperating movable abutment comprises a rearwardly extended arm 134 which is carried by the vertical angle 64 of each truck adjacent the side wall 14 of the cell in position to cooperate with the abutment 130, whereby to prevent movement of the switch truck into a position in the cell in which its automatic disconnects are engaged with the line and bus terminals if the rear disconnecting switch compartment doors 92 are in the open position and the abutment 130 is in the elevated dotted position of Fig. 3, in which position the arcute end portion 136 of said abutment 134 will engage the arcuate face 132 of said cam member 130.

Figure 3:
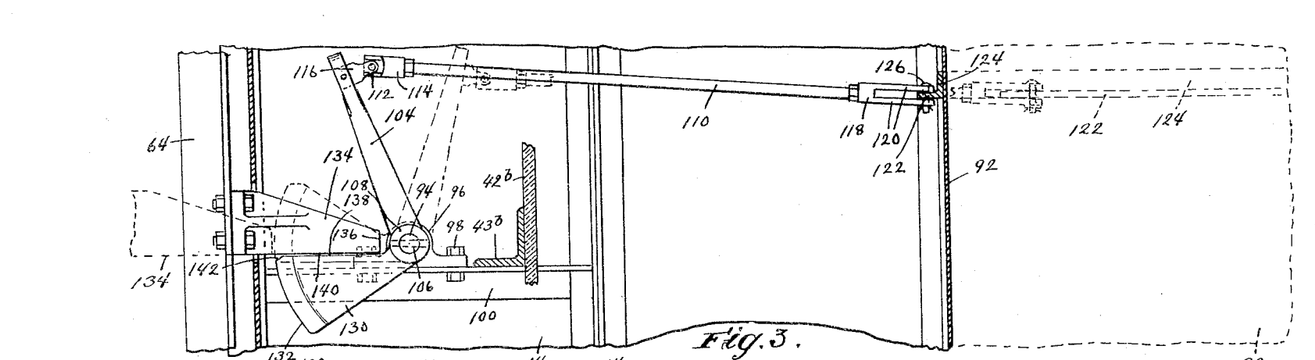
Fig. 3 is a detailed side elevation showing the interlocking mechanism for the disconnecting switch compartment doors.
Figure 4:
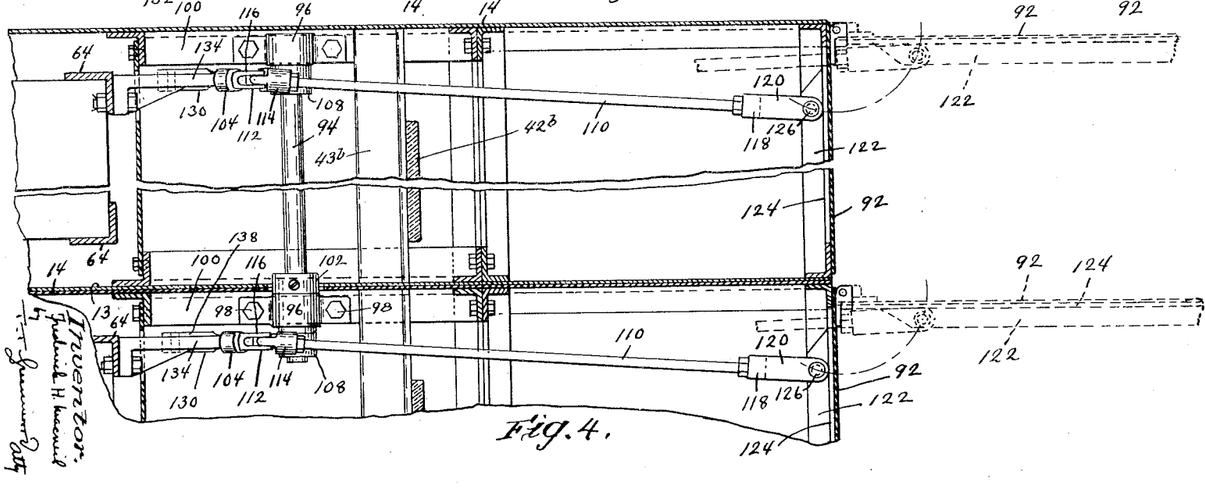
Fig. 4 is a detail plan view of the mechanism of Fig. 3.

Said abutment 130 is provided with an upper normally horizontal face 138 which is adapted to pass beneath the lower horizontal face 140 of said projection 134 in the lower full line position of the cam member 130, Fig. 3, in which position of the cam member the disconnecting switch compartment doors are closed. With the doors closed and the abutment member 130 in this position, when once the switch has been moved sufficiently into circuit controlling position in the cell to bring the ends of projections 130 and 134 into overlapping relation, opening of the doors 92 is impossible due to the engagement of the cooperating faces 138 and 140 thereof.

Due to the fact that the sector shaped abutments 130 of the two compartment doors are interconnected for conjoint operation by means of the connecting shaft 94, it will be evident that with either of the switches in the circuit controlling position shown in Fig. 1, it will be impossible to open either one of the disconnecting switch compartment doors, due to the interference of the projection 134 of said switch with its cooperating projecting arm 130, thus to prevent access to any of the disconnecting switches until both of the main switches have been completely withdrawn and the bus has been electrically isolated. It is then possible to open the disconnecting switch compartment doors. Assuming the doors to be open, however, it will be impossible to return either of the switch trucks to the circuit controlling position thereof in the cell due to the engagement of the cooperating abutment faces 136 and 132 of projections 134 and 130. From an inspection of Fig. 3, it will be obvious that only in the fully lowered, or full line, position of the arm 130, when the doors are completely closed, can the projection 134 clear the abutment face 132. The face 138 is provided with a slight inclined cam face 142 over which the projection 134 is adapted to ride to facilitate the movement of the truck into the position shown in Fig. 3 free from interference with the abutment 130.

Various changes and modifications may be made in the construction and arrangement without departing from the scope of the invention.

I claim:

1. In an electric switch gear, the combination of an inclosing cell, a truck type switch movable into and out of a circuit controlling position in the cell, a disconnecting switch compartment having a door governing access thereto, a disconnecting switch located in said compartment, and cooperating means carried by the switch and cell governed by the movements of said switch to and from said circuit controlling position to control the locking and unlocking of said door.

2. In an electric switch gear, the combination of an inclosure cell containing incoming and outgoing high tension lines each having therin a fixed terminal member which constitutes the stationary contact member of an automatic isolating switch, a circuit interrupter having terminal contact members which are movable into and out of a circuit controlling position in which position its terminals are arranged to engage separately the stationary terminals of said lines, a manually operable disconnecting switch controlling the circuit including said interrupter and accessible through an opening in said inclosure, a removable closure for said opening, a locking element movable with said closure and disposed adjacent said interrupter, and means governed by the movements of said interrupter into and out of its circuit controlling position and positioned in engagement with said locking element to hold it and said closure from opening when said interrupter is in circuit-controlling position.

3. In an electric switch gear, the combination of an inclosing cell having a main switch compartment and a disconnecting switch compartment, a main switch movable into and out of a circuit controlling position in said main switch compartment, a disconnecting switch in said disconnecting switch compartment, said disconnecting switch compartment having an opening in a side wall thereof, a door for said disconnecting switch compartment providing a removable closure for said opening, and means for locking said door closed having means governed by the aforesaid movements of said main switch to and from its circuit controlling position which controls the locking and unlocking of said door.

4. In an electric switch gear, the combination of an inclosing cell structure including main switch compartments, a disconnecting switch compartment, said compartments having openings at the front and back of said cell structure respectively, main truck type switches movable into and out of a circuit controlling position in said main compartments, a disconnecting switch located in said disconnecting switch compartment, a door forming a removable closure for the opening in said disconnecting switch compartment, and locking mechanism for said door having parts controlled by both main switches and movable into an unlocking position only when both main switches are out of circuit controlling position in the cell.

5. In an electric switch gear, the combination of an inclosing cell structure having a main switch compartment and a disconnecting switch compartment, said compartments having separate openings, a main truck type switch movable into and out of a circuit controlling position in said main switch compartment and when therein providing a closure for the opening of said compartment, a disconnecting switch located in said disconnecting switch compartment and controlling the electric circuit through said main switch, a door providing a removable closure for the opening of said disconnecting switch compartment whereby to prevent access to said disconnecting switch, and means to lock said door in compartment closing position including a locking member disposed adjacent said main switch and movable into positions corresponding to positions of the door, and means including an abutment carried by and movable with said truck type switch into and out of its circuit controlling position in the cell arranged when said main switch is in the cell to hold said locking means against movement in a door-opening direction.

6. In an electric switch gear, the combination of an inclosing cell having main switch compartments and a disconnecting switch compartment, said compartments having separate openings, main switches movable into and out of a circuit controlling position in said main switch compartments, a disconnecting switch in said disconnecting switch compartment controlling the circuit including said main switch, a door providing a removable closure for the opening of said disconnecting switch compartment, locking means for said door governed by the movement of any one of said main switches into its circuit controlling position in the cell to lock said door closed, said locking means also having means which prevents movement of any one of said main switches into its circuit controlling position with said door in any other than the closed position thereof.

7. In an electric switch gear, the combination of an inclosing cell having a main switch compartment and a disconnecting switch compartment, said compartments having separate openings, a main switch movable into and out of a circuit controlling position in said main switch compartment, a disconnecting switch in said disconnecting switch compartment controlling the circuit including said main switch, a door providing a removable closure for the opening of said disconnecting switch compartment, cooperating interlocking means governed by the movements of said door and main switch respectively arranged to lock said door closed when the main switch is in its circuit controlling position and also when said main switch is withdrawn therefrom to obstruct the movement of said main switch toward its circuit controlling position in any other than the closed position of said door.

8. In an electric switch gear, the combination of an inclosing cell having a main switch compartment and a disconnecting switch compartment, said compartments having separate openings, a main switch movable into and out of a circuit controlling position in said main switch compartment, a disconnecting switch in said disconnecting switch compartment controlling the circuit including said main switch, a door providing a removable closure for the opening of said disconnecting switch compartment, an abutment carried by said cell movable between two positions corresponding to the closed and open positions of said door, a cooperating abutment carried by said truck type switch arranged in the closed position of said door to override said fixed abutment member when said main switch is moved to its circuit controlling position in the cell, whereby to prevent opening movement of said door.

9. In an electric switch gear, the combination of an inclosing cell having a main switch compartment and a disconnecting switch compartment, said compartments having separate openings, a main switch movable into and out of a circuit controlling position in said main switch compartment, a disconnecting switch in said disconnecting switch compartment controlling the circuit including said main switch, a door providing a removable closure for the opening of said disconnecting switch compartment, a movable abutment carried by said cell adjacent said main switch having a connection with said door by which it is movable between two positions corresponding to the closed and open positions of said door, a cooperating abutment carried by said main switch arranged in the closed position of said door to override said door abutment when said main switch is moved to its circuit controlling position in the cell, whereby to prevent opening movement of said door, said door abutment arranged in the open position of said door to occupy a position in the path of movement of said switch abutment whereby to prevent the movement of said main switch into said circuit controlling position.

10. In an electric switch gear, the combination of an inclosing cell having a main switch compartment and a disconnecting switch compartment, said compartments having separate openings, a main switch movable into and out of a circuit controlling position in said main switch compartment, a disconnecting switch in said disconnecting switch compartment controlling the circuit including said main switch, a door providing a removable closure for the opening of said disconnecting switch compartment, cooperating interlocking means carried by said switch and cell which prevents opening said door when said main switch is in its circuit controlling position and also which prevents the movement of said main switch into said position if said door is open, said means including a reciprocating lever member carried by said cell and having an operative connection with said door and a cooperating abutment member carried by and movable with said main switch arranged to engage said lever member in the door open position thereof whereby to obstruct the movement of said switch and to override and lock said lever member against movement in the door closed position thereof.

11. In an electric switch gear, the combination of an inclosing cell having a main switch compartment and a disconnecting switch compartment, a truck type main switch adapted to be moved into and out of its circuit controlling position in said main compartment having terminal contact members adapted to engage cooperating fixed contact members in the cell, a disconnecting switch located in said disconnecting switch compartment arranged to control the circuit including said main switch, a door forming a removable closure for said disconnecting switch compartment, a pivotal lever having an operative connection with said door arranged to be moved between two positions corresponding to the open and closed positions of the door, a cooperating abutment member carried by the main switch arranged to cooperate with said pivoted lever to lock said lever against movement from the door-closed position thereof when said main switch is in its circuit controlling position and also arranged to engage a projection of said pivoted lever in the door open position thereof whereby to prevent movement of said main switch into its circuit controlling position in any but the closed position of said door.

12. In an electric switch gear, the combination of an inclosing cell having a main switch compartment and a disconnecting switch compartment, a truck type main switch adapted to be moved into and out of its circuit controlling position in said main compartment having terminal contact members adapted to engage cooperating fixed contact members in the cell, a disconnecting switch located in said disconnecting switch compartment arranged to control the circuit including said main switch, a door forming a removable closure for said disconnecting switch compartment, a forwardly extended pivoted arm carried by said cell terminating at its forward end in an enlarged end portion, means connecting said arm with said door whereby to move said arm between two positions thereof corresponding to the open and closed positions of said door, a cooperating rearwardly projecting abutment carried by said main switch terminating in an abutment face which is adapted to engage the end face of said arm in any but the door closed position thereof, said abutment member and arm having aligned upper and lower horizontal faces which are adapted to override each other in the door closed position of said arm.

13. In an electric switch gear, the combination of a pair of adjacent inclosing cell structures each having a main switch compartment and a disconnecting switch compartment, a high tension bus common to both cell structures, main truck type switches adapted to be moved into and out of circuit controlling position in said main switch compartments having terminals which constitute the movable contact members of automatic isolating switches, cooperating stationary contact members located in said cells and connected electrically with said bus, high tension conductors connected with said bus and extended through said disconnecting switch compartments, disconnecting switches located in said compartments controlling said high tension lines, separate doors for said compartments forming removable closures therefor, whereby to permit access to said disconnecting switches, means interconnecting said doors for conjoint operation, abutment members associated with said interconnecting means and movable therewith between two positions corresponding to the open and closed positions of said doors, and cooperating abutment members carried by said main switches arranged in the circuit controlling position of said switches to engage said first named abutments and lock said doors against opening movement.

14. In an electric switch gear, the combination of a pair of adjacent inclosing cell structures each having a main switch compartment and a disconnecting switch compartment, a high tension bus common to both cell structures, main truck type switches adapted to be moved into and out of circuit controlling position in said main switch compartments having terminals which constitute the movable contact members of automatic isolating switches, cooperating stationary contact members located in said cells and connected electrically with said bus, high tension conductors connected with said bus and extended through said disconnecting switch compartments, disconnecting switches located in said compartments controlling said high tension lines, separate doors for said compartments forming removable closures therefor, whereby to permit access to said disconnecting switches, means interconnecting said doors for conjoint operation, abutment members associated with said interconnecting means and movable therewith between two positions corresponding to the open and closed positions of said doors, and cooperating abutment members carried by said main switches arranged in the circuit controlling position of said switches to engage said first named abutments and lock said doors against opening movement, and arranged also to engage a projecting portion of said first abutment members in any other than the door closed position thereof whereby to prevent movement of either of said main switches into circuit controlling position.

15. In an electric switch gear, the combination of a pair of adjacent inclosing cell structures each having a main switch compartment and a disconnecting switch compartment, a high tension bus common to both cell structures, main truck type switches adapted to be moved into and out of circuit controlling position in said main switch compartments having terminals which constitute the movable contact members of automatic isolating switches, cooperating stationary contact members located in said cells and connected electrically with said bus, high tension conductors connected with said bus and extended through said disconnecting switch compartments, disconnecting switches located in said compartments controlling said high tension lines, separate doors for said compartments forming removable closures therefor, whereby to permit access to said disconnecting switches, means interconnecting said doors for conjoint operation, and means governed by the presence of either main switch in its cell to maintain the doors of both compartments locked.

16. In an electric switch gear, the combination of a pair of adjacent inclosing cell structures each having a main switch compartment and a disconnecting switch compartment, a high tension bus common to both cell structures, main truck type switches adapted to be moved into and out of circuit controlling position in said main switch compartments having terminals which constitute the movable contact members of automatic isolating switches, cooperating stationary contact members located in said cells and connected electrically with said bus, high tension conductors connected with said bus and extended through said disconnecting switch compartments, disconnecting switches located in said compartments controlling said high tension lines, separate doors for said compartments forming removable closures therefor, whereby to permit access to said disconnecting switches, means interconnecting said doors for conjoint operation, means associated with said interconnecting means for locking said doors in closed position, and means governed by the movement of either main switch into and out of its circuit controlling position to control the locking and unlocking of both doors.

17. In an electric switch gear, the combination of a pair of adjacent inclosing cell structures each having a main switch compartment and a disconnecting switch compartment, a high tension bus common to both cell structures, main truck type switches adapted to be moved into and out of circuit controlling position in said main switch compartments having terminals which constitute the movable contact members of automatic isolating switches, cooperating stationary contact member located in said cells and connected electrically with said bus, high tension conductors connected with said bus and extended through said disconnecting switch compartments, disconnecting switches located in said compartments controlling said high tension lines, separate doors for said compartments forming removable closures therefor, whereby to permit access to said disconnecting switches, means interconnecting said doors for conjoint operation, including a rotatable shaft extended through the adjacent side walls of said cells having generally vertical arms fixed thereto which are operatively connected with said doors, forwardly extended angularly related arms carried by said shaft having enlarged forward end portions and having upper flat surfaces which in the closed position of said doors are horizontal, cooperating rearwardly extended abutment members carried by said main switches having lower horizontal flat faces which are arranged to overlie the horizontal flat faces of said arms when said main switches are in circuit controlling position, whereby to lock said doors closed, said main switch abutments having end abutment faces which are adapted to engage the enlarged end portions of said arm upon movement of said main switches into circuit controlling position when said doors are in any other than the fully closed position thereof, whereby to prevent movement of either switch into its circuit controlling position unless both doors are closed.

18. Electric switch gear comprising a supporting structure, draw-out switches on said structure, a disconnecting switch for the circuit of a draw-out switch contained in a compartment of said structure, a door for said compartment, and means governed by the positions of all of said draw-out switches relative to said structure for controlling the opening of said door.

19. Electric switch gear comprising a supporting structure, draw-out switches on said structure, a disconnecting switch for the circuit of a draw-out switch contained in a compartment of said structure, a door for said compartment, and means governed by a predetermined position of said door for preventing a movement of any draw-out switch in a predetermined direction on said structure.

20. Electric switch gear comprising a supporting structure, draw-out switches on said structure, a disconnecting switch for the circuit of a draw-out switch contained in a compartment of said structure, a door for said compartment, and means governed by a predetermined position of any draw-out switch for preventing the opening of said door and also governed by a predetermined position of said door for controlling movement of any draw-out switch in a predetermined direction on said structure.

21. Electric switch gear comprising a supporting structure, draw-out switches on said structure, a disconnecting switch for the circuit of a draw-out switch contained in a compartment of said structure, a door for said compartment, and door-operated mechanism including abutments, and means which interposes said abutments in the path of movement of said draw-out switches when said door is open.

In testimony whereof, I have signed my name to this specification.

FREDERICK H. MACNEIL.